W. M. McNEILL.
SOOT BLOWER.
Reissued Aug. 30, 1921. 15,185.
APPLICATION FILED JUNE 29, 1921.
4 SHEETS—SHEET 1.
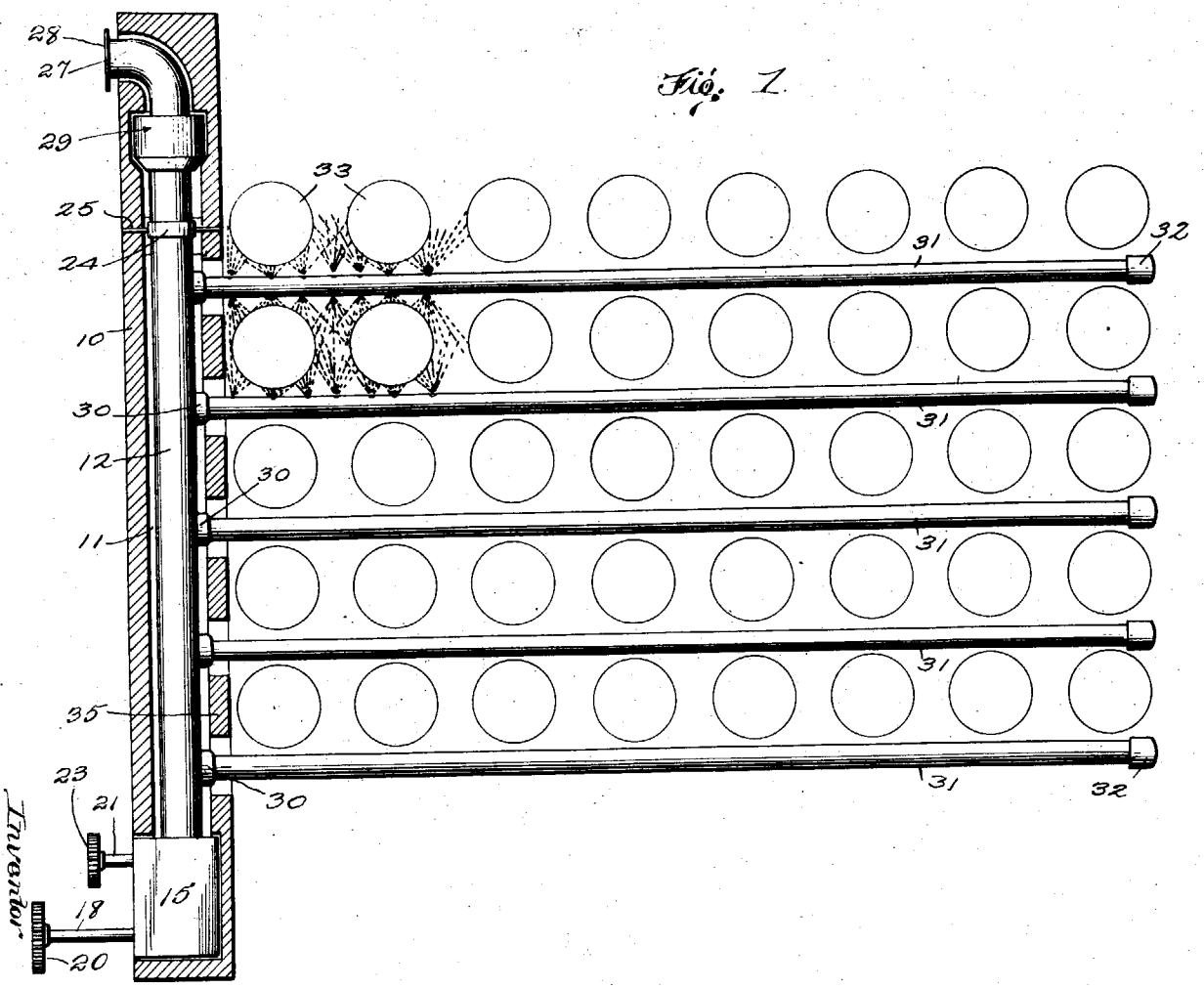
Inventor
W. M. McNeill.
Chas. Parker
Atty.

W. M. McNEILL.
SOOT BLOWER.
Reissued Aug. 30, 1921. APPLICATION FILED JUNE 29, 1921. 15,185.
4 SHEETS—SHEET 2.
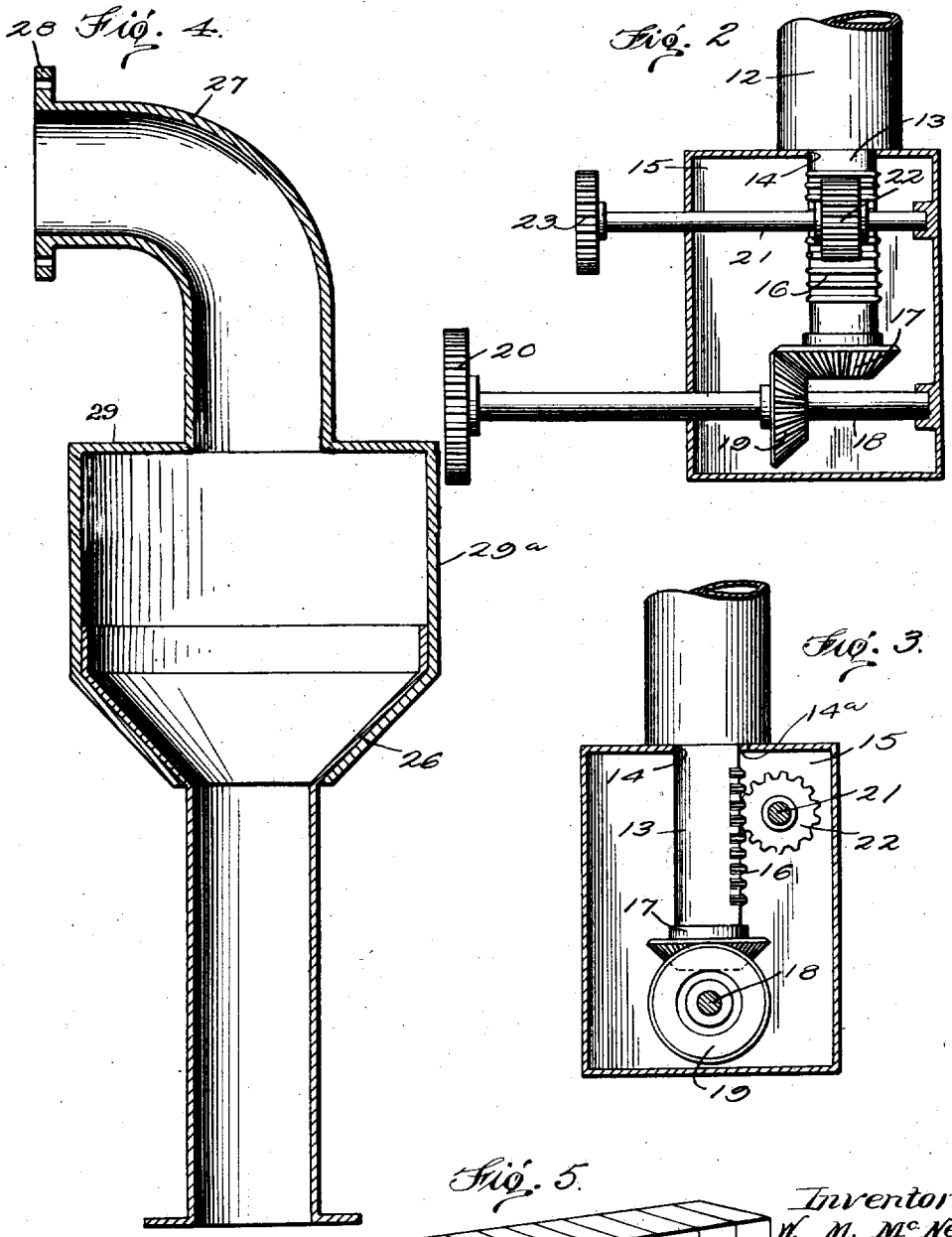
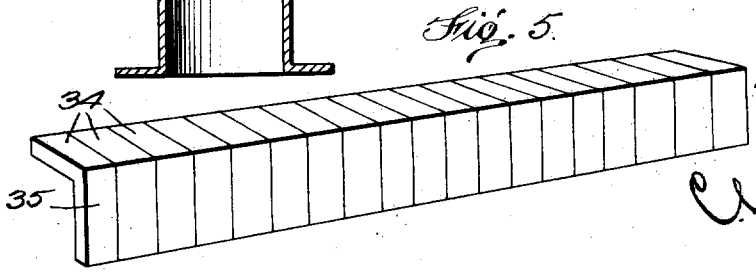
Inventor
W. M. McNeill.
Ch. Parker
Atty.

W. M. McNEILL.

SOOT BLOWER.

Reissued Aug. 30, 1921. APPLICATION FILED JUNE 29, 1921. 15,185.

4 SHEETS—SHEET 3.

Inventor:
W. M. McNeill.

Ch. Barker
Atty.

W. M. McNEILL.

SOOT BLOWER.

Reissued Aug. 30, 1921. 15.185.

APPLICATION FILED JUNE 29, 1921.

4 SHEETS—SHEET 4.

Inventor
W. M. McNeill.

Chas. Parker
Atty

UNITED STATES PATENT OFFICE.

WILLIAM M. McNEILL, OF LOGANSPORT, INDIANA, ASSIGNOR OF ONE-HALF TO BILLIE M. SHEFFEY, OF ROSICLARE, ILLINOIS.

SOOT-BLOWER.

15,185. Specification of Reissued Letters Patent. Reissued Aug. 30, 1921.

Original No. 1,373,750, dated April 5, 1921, Serial No. 313,164, filed July 25, 1919. Application for reissue filed June 29, 1921. Serial No. 481,702.

*To all whom it may concern:*

Be it known that I, WILLIAM M. McNEILL, a citizen of the United States, residing at Logansport, in the county of Cass and State of Indiana, have invented certain new and useful Improvements in Soot-Blowers, of which the following is a specification.

This invention relates to new and useful improvements in soot blowers, and more particularly to soot blowers for boiler furnaces.

As is well known, boiler furnaces are generally supplied with rows of water tubes, in which the water to be heated is circulated. Soot, carried by the products of combustion, collects upon these tubes and has a tendency to insulate the tubes from the heat and consequently to lower the heat of the boiler. It has been the practice to supply the boiler with what is termed a false plate, which covers a number of openings in the fire wall of the combustion chamber. Through these openings is introduced an open ended pipe of considerable length connected with a source of compressed air supply, the purpose being to blow the soot from the tubes. This operation is exceedingly tedious and where a large battery of boilers is used, requires the undivided attention of at least one man.

In order to facilitate the operation of blowing the soot from the flues, I have provided in the fire wall of the combustion chamber, a rotatable tubular member provided with a number of tubular arms, having openings therein. To the tubular member is introduced compressed air or steam which, passing out through the openings in the arms, operates to blow the soot from the tubes, means being provided whereby the tubes may be oscillated within the furnace. Means are also provided to protect the tube from the action of the products of combustion.

Further objects will be obvious during the course of the following discussion.

Figure 6:
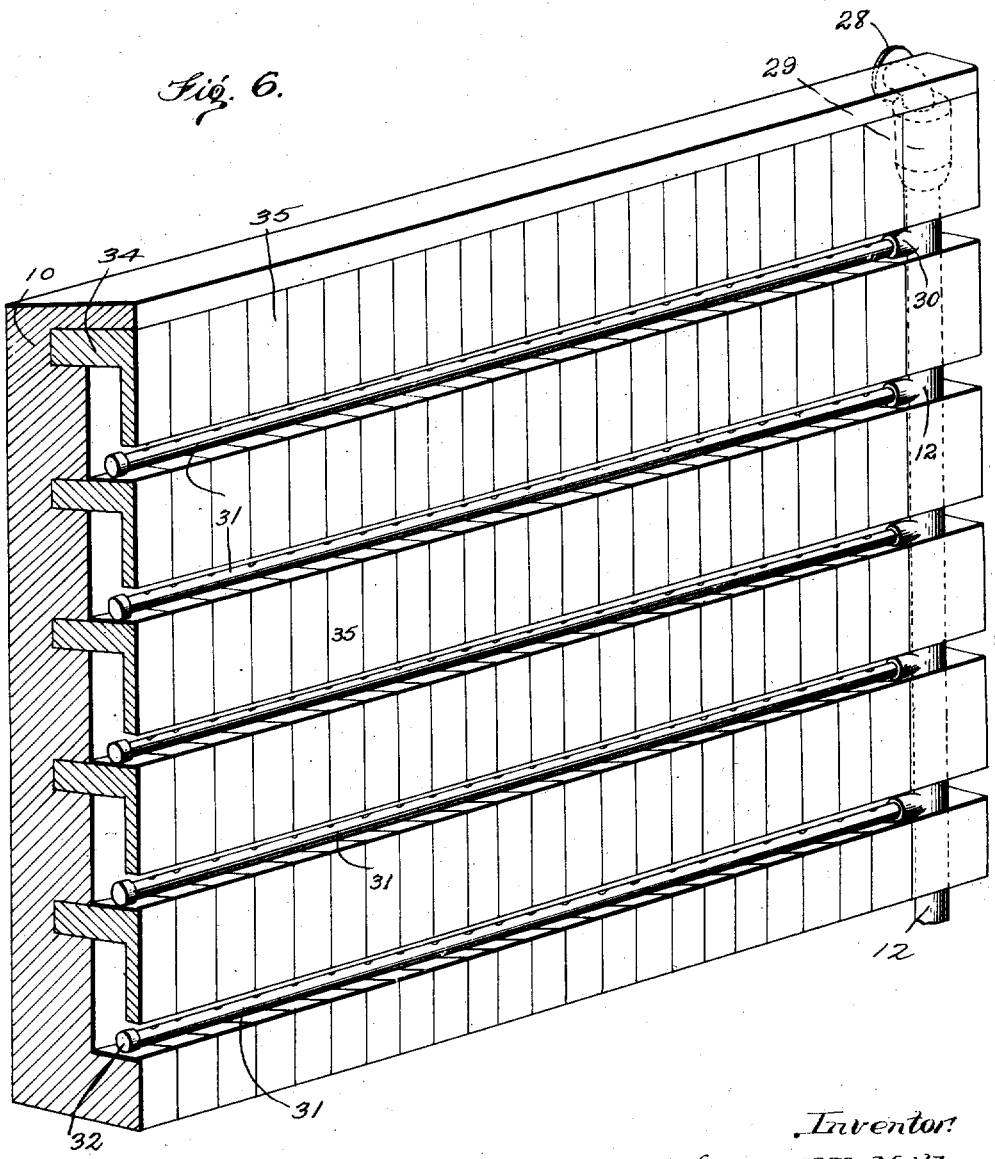
Figure 7:
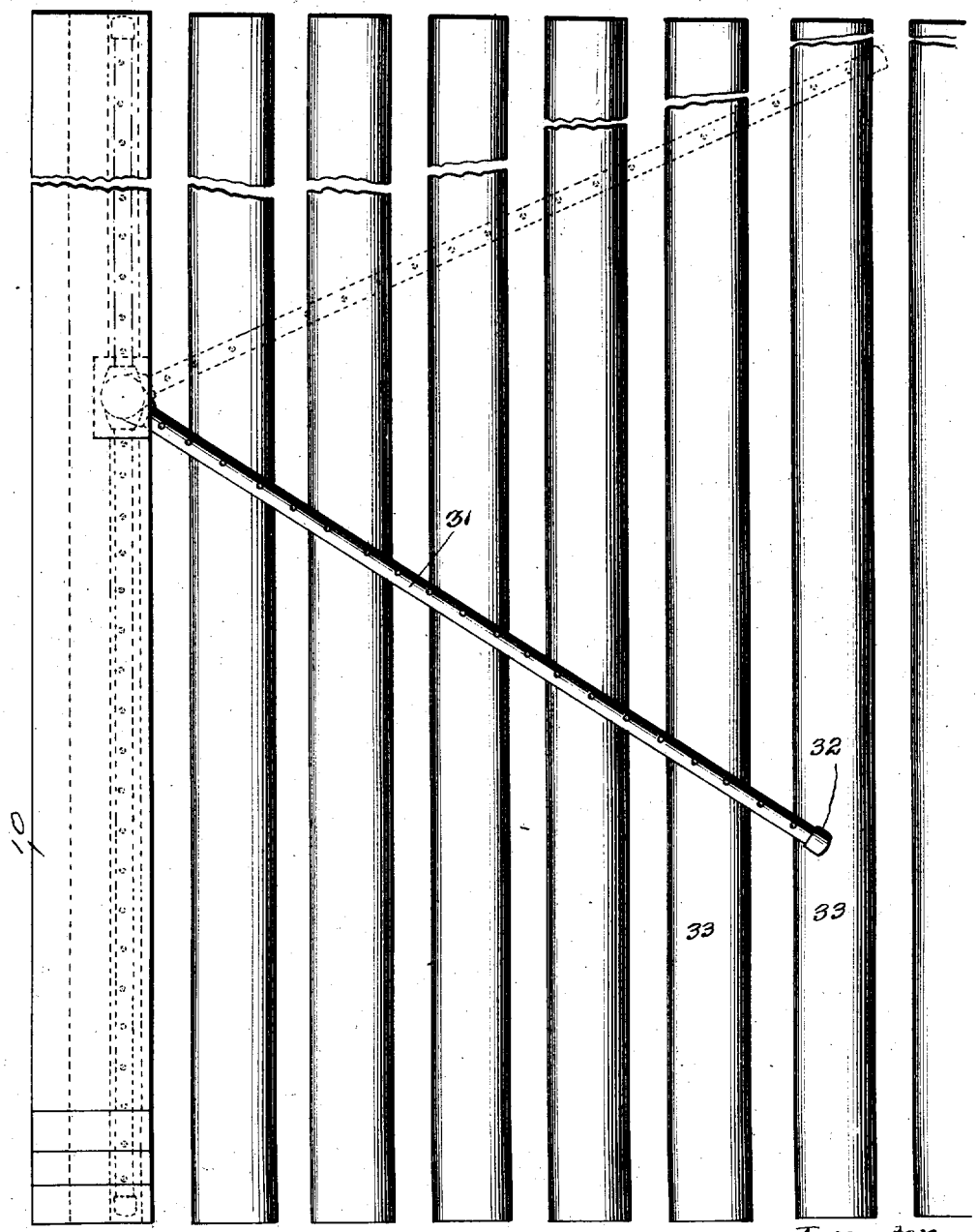

In the drawings, wherein for the purpose of illustration is shown a preferred embodiment of my device, and in which like numerals are employed to designate like parts throughout the same, Figure 1 is a side elevation, partly in section, showing my device arranged in the combustion chamber, of a boiler, Fig. 2 is a side elevation, partly in section, showing the lower end of the tubular member, Fig. 3 is a front elevation, partly in section, of the lower end of the tubular member, Fig. 4 is a sectional view of the upper end of the tubular member, Fig. 5 is a perspective view of the protecting tile, Fig. 6 is a perspective view showing my device in position in the boiler and illustrating the application of the protecting tile, and, Fig. 7 is a plan view of my device.

Referring now more particularly to the drawings, the numeral 10 designates the fire wall of the combustion chamber of a furnace.

The fire wall 10 is provided with a vertical opening 11, in which is arranged a tubular member 12. The tubular member 12 is closed at its lower end and provided with a reduced extension 13, which extends through an opening 14, formed in a casing 15.

Extension 13 is provided from one side thereof, with a rack 16, for a purpose hereinafter to appear. Upon the lower end of the extension 13 is mounted a miter gear 17. A shaft 18 is suitably journaled in the casing 15 and has secured thereto a miter gear 19, meshing with the gear 17. One end of the shaft 18 extends outside the casing, and is provided with means 20 for rotating the same. Mounted upon the shaft 18 is a second shaft 21, having secured thereto a pinion 22 meshing with the rack 16 on the extension 13. The outer end of the shaft 21 is provided with means for rotating the same, 23.

Surrounding the tubular member 12 adjacent to the upper end thereof is a sleeve 24, provided with radial arms 25, which are embedded in the fire wall. This sleeve positions the upper end of the tubular member. The extreme upper end of the tubular member is provided with an enlargement 26, forming the male member of a bell slip joint. Mounted above the tubular member is an L 27, provided upon its upper end with a flange 28. The lower end of the L is expanded either at right angles as shown in Fig. 1, or downwardly as shown in Fig. 4, to form the female member 29 of the slip joint, this slip joint being provided with a substantially long straight portion 29[a].

It will be readily seen that the tubular member may be rotated by the rotation of the shaft 18 and be elevated by the rotation of the shaft 21. The tubular member is provided upon one side thereof with a plurality of alined sockets 30. Mounted in these sockets are tubes 31 having their outer ends 32 closed by a cap or the like. These tubes are provided throughout their length with upper and lower openings and the tubes are arranged intermediate adjacent rows of the boiler tubes 33.

Embedded in the wall of the combustion chamber are angular fire tiles 34, the depending flanges 35 of these tiles being spaced from the wall, as clearly shown in Fig. 6. These tiles are so spaced vertically as to leave between the bottom of one tile and the top of the next, a space sufficient to receive the tube 33. The flanges 35 of the tile have their faces spaced sufficiently far from the fire wall to afford a recess for nesting the tubes therein. If desired, these recesses may be formed directly in the wall of the furnace. The spaces and recesses formed in the wall communicate with the vertical openings 14.

The operation of my device is as follows: The L 27 is connected with a suitable source of compressed air or steam supply, the compressed air or steam being delivered by the tubes 31 through the openings 32 thereof. By means of the shaft 18, the tubular member is oscillated, swinging the tubes as suggested, by the varying positions shown in Fig. 7. It will be clearly seen that the tube will cover a comparatively large area of the interior of the boiler, blowing down the soot from the boiler tubes. When the operation of cleaning the tubes is completed, the tubes are swung to the position shown in Fig. 6. The shaft 18 is now rotated and the tubular member elevated, so that the tubes are placed behind the depending flanges 35 of the protecting tiles 34.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a device of the type described, a tubular member, means for supplying fluid pressure to said tubular member, said tubular member being capable of reciprocation and oscillation, a plurality of tubes having openings formed therein, said tubes communicating at one end with said tubular member, means for oscillating said tubular member comprising a casing having an opening formed therein, an extension formed in the lower end of said tubular member extending through said opening, a gear carried by said extension, a shaft mounted within the casing provided with a gear meshing with the gear on said extensions, and means for actuating said shaft, and means for reciprocating said tubular member embodying a rack formed upon said extension and a shaft rotatable within said casing and provided with a gear meshing with said rack.

2. In a device of the type described, the combination with the fire wall of a combustion chamber having recesses formed therein, of a tubular member, means for supplying fluid pressure to said tubular member, said tubular member being mounted to reciprocate, a plurality of tubes having openings formed therein communicating at one end with the interior of said tubular member, said tubes corresponding in number and arrangement to said recesses, said recesses having portions parallel to said tubular members and other portions at an angle thereto and communicating with the interior of the combustion chamber, and means for vertically reciprocating said tubular member to bring said tubes into alinement with the portions of said recesses communicating with the combustion chamber.

3. In a device of the type described, the combination with the fire wall of a combustion chamber having angular tiles embedded therein affording recesses having portions communicating with the interior of the combustion chamber and portions at an angle thereto lying behind said tiles, of a tubular member, means for supplying fluid pressure to said tubular member, said tubular member being mounted for reciprocation and oscillation, a plurality of tubes having openings formed therein, said tubes communicating at one end with the interior of said tubular member and being normally disposed in the portions of said recesses lying behind said tiles, means for oscillating said tubular member, and means for vertically reciprocating said tubular member.

4. In a device of the type described, the combination with the fire wall of a combustion chamber having angular tiles embedded therein affording horizontal recesses, of a vertical opening formed in said wall and communicating with said recesses, a tubular member mounted for reciprocation and oscillation in said vertical opening and having spaced sockets formed therein corresponding in number and arrangement to said recesses, means for supplying fluid pressure to said tubular member, tubes mounted in said sockets, said tubes being provided with spaced openings and having their outer ends closed, means for oscillating said tubular member, and means for vertically reciprocating said tubular member.

5. In a device of the type described, the combination with a water tube boiler having a combustion chamber provided with recesses in one wall thereof parallel with the water tubes, said recesses having portions communicating with the interior of the combustion chamber and portions forming pockets within the wall of the combustion chamber, tubes having openings formed therein and normally disposed within said pockets, said tubes being capable of shifting and oscillating means for supplying fluid pressure to said tubes, means for shifting said tubes to bring them into alinement with the portions of said recesses communicating with the interior of the combustion chamber, and means for oscillating said tubes.

6. In a device of the type described, the combination with a water tube boiler having a combustion chamber provided with a recess in one wall thereof, said recess having a portion communicating with the interior of the combustion chamber and a portion forming a pocket within said wall, of a tube having openings formed therein and normally disposed within said pocket, said tube being capable of shifting and oscillating, means for supplying fluid pressure to said tube, means for shifting said tube to bring it into alinement with the portion of the recess communicating with the interior of the combustion chamber, and means for oscillating said tube.

In testimony whereof, I affix my signature, in the presence of two witnesses.

W. M. McNEILL.

Witnesses:

Don C. Richeson,

Othello A. Smith.